(12) United States Patent
Vassilev

(10) Patent No.: US 12,657,057 B2
(45) Date of Patent: Jun. 16, 2026

(54) INDEPENDENT AGENT SYNCHRONIZATION USING DOMAIN NAME SYSTEM

(71) Applicant: SAP SE, Walldorf (DE)

(72) Inventor: Iantcho Todorov Vassilev, Sofia (BG)

(73) Assignee: SAP SE, Walldorf (DE)

( * ) Notice: Subject to any disclaimer, the term of this patent is extended or adjusted under 35 U.S.C. 154(b) by 788 days.

(21) Appl. No.: 17/864,727

(22) Filed: Jul. 14, 2022

(65) Prior Publication Data

US 2024/0020156 A1     Jan. 18, 2024

(51) Int. Cl.
H04L 61/4511     (2022.01)
G06F 9/48     (2006.01)

(52) U.S. Cl.
CPC ........ G06F 9/4887 (2013.01); H04L 61/4511 (2022.05)

(58) Field of Classification Search
CPC ............................ G06F 9/4887; H04L 61/4511
See application file for complete search history.

(56) References Cited

U.S. PATENT DOCUMENTS 11,019,023  B1 *   5/2021  Hegde ................. H04L 67/1053
2009/0125627  A1 *   5/2009  Ford ..................... H04L 67/025
                                                                    709/227

2010/0211637  A1 *   8/2010  Borzsei ................... H04L 67/51
                                                                    709/204
2012/0096051  A1 *   4/2012  Davis ...................... H04L 41/22
                                                                    707/805
2012/0210018  A1 *   8/2012  Mendel ............. G06F 15/17312
                                                                    709/242
2016/0378583  A1 *   12/2016  Nakano ............... G06F 11/3034
                                                                    714/37
2020/0104170  A1 *   4/2020  Else ....................... G06F 9/4887
2020/0174826  A1 *   6/2020  Wimmer ............... G06F 9/4887
2020/0296109  A1 *   9/2020  Shulman ............... H04L 63/104
2021/0092088  A1 *   3/2021  Ramachandran ... H04L 61/4511
2021/0266185  A1 *   8/2021  Konda ................ H04L 61/4511
2022/0276896  A1 *   9/2022  Antonsson ............ G06F 9/4887

* cited by examiner

*Primary Examiner* — Aimee Li
*Assistant Examiner* — An-An Ngoc Nguyen
(74) *Attorney, Agent, or Firm* — Buckley, Maschoff & Talwalkar LLC

(57)     ABSTRACT

An agent task scheduler may include a local timer to generate a current local timer value. An agent task scheduler, independent of other agent task schedulers, may arrange to periodically perform a task scheduling process. The agent task scheduler may obtain a current Domain Name System ("DNS") text record that includes a next timer value indicating when a task should next be executed and a prior timer value indicating when the task was last executed. If the current local timer value is greater than the next timer value in the DNS text record, the scheduler may update the next timer value in the DNS text record to the current local timer value plus a value associated with periodic performance of the task scheduling process. The scheduler may also update the prior timer value in the DNS text record to the current local timer value and perform the task.

21 Claims, 11 Drawing Sheets

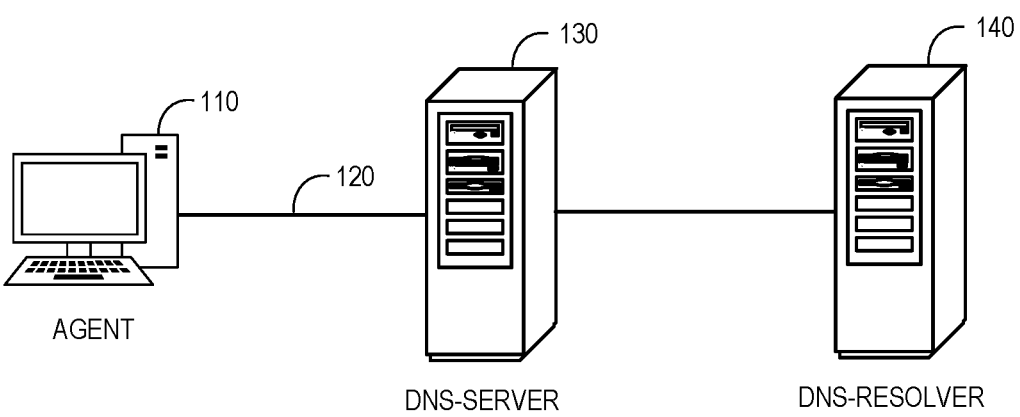
AGENT
DNS-SERVER
DNS-RESOLVER
*FIG. 1*

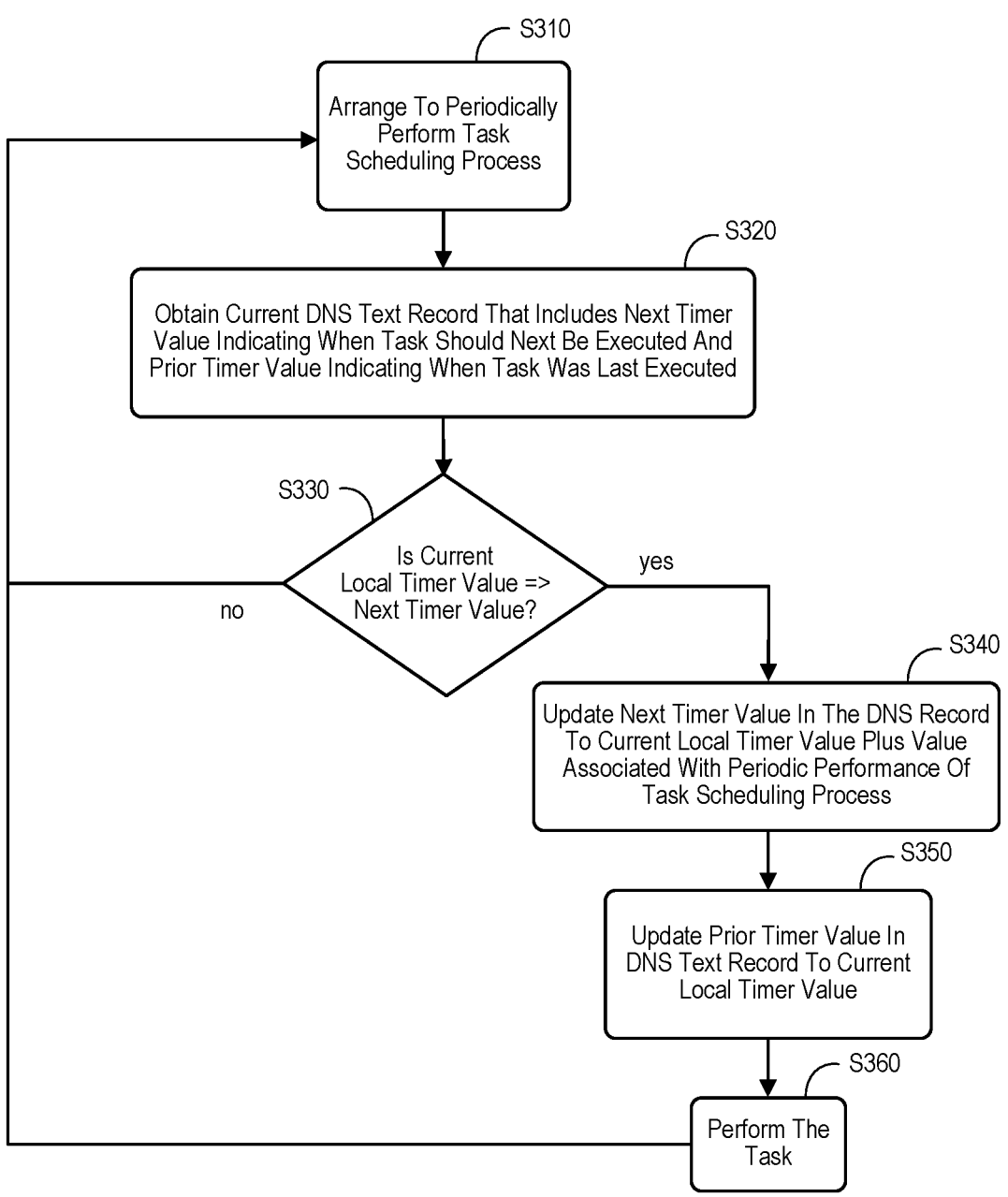

S310

Arrange To Periodically
Perform Task
Scheduling Process

S320

Obtain Current DNS Text Record That Includes Next Timer
Value Indicating When Task Should Next Be Executed And
Prior Timer Value Indicating When Task Was Last Executed

S330

Is Current
Local Timer Value =>
Next Timer Value?

no yes

S340

Update Next Timer Value In The DNS Record
To Current Local Timer Value Plus Value
Associated With Periodic Performance Of
Task Scheduling Process

S350

Update Prior Timer Value In
DNS Text Record To Current
Local Timer Value

S360

Perform The
Task

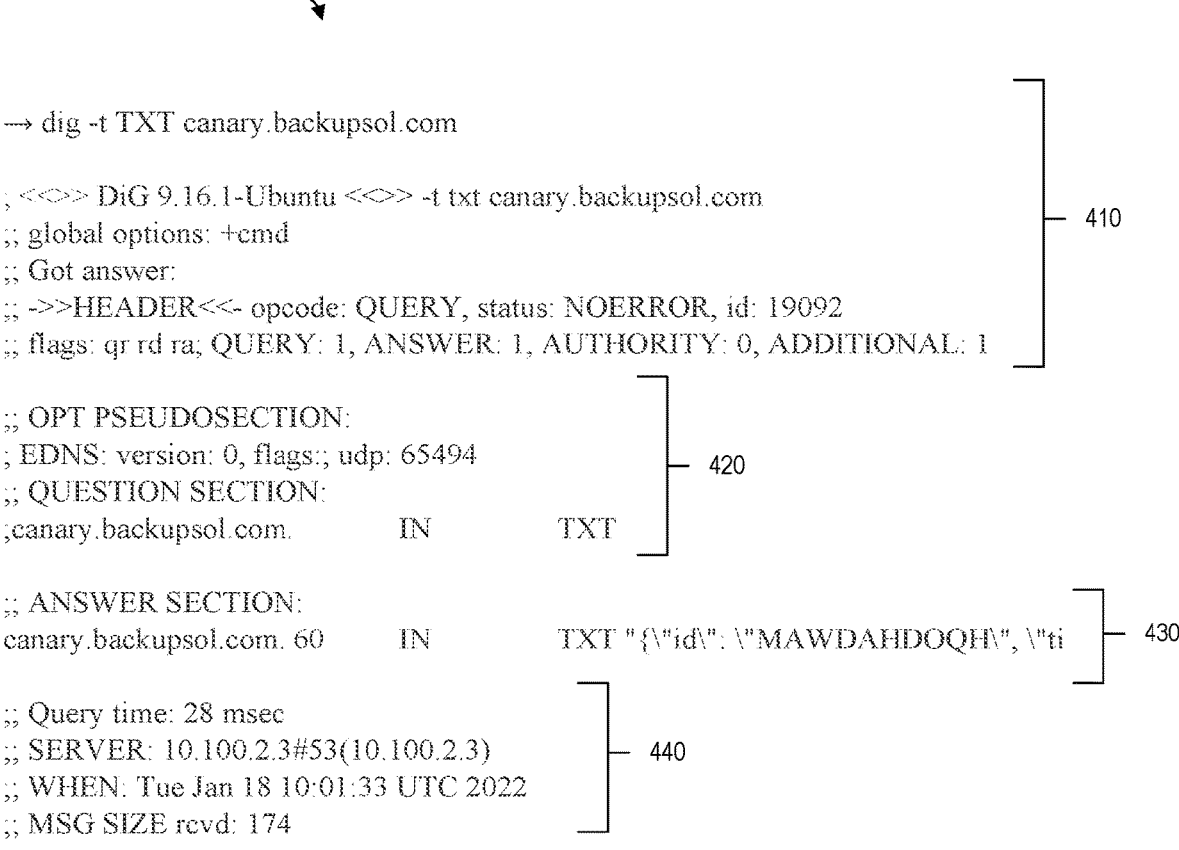

→ dig -t TXT canary.backupsol.com

; <<>> DiG 9.16.1-Ubuntu <<>> -t txt canary.backupsol.com
;; global options: +cmd
;; Got answer:
;; ->>HEADER<<- opcode: QUERY, status: NOERROR, id: 19092
;; flags: qr rd ra; QUERY: 1, ANSWER: 1, AUTHORITY: 0, ADDITIONAL: 1    — 410

;; OPT PSEUDOSECTION:
; EDNS: version: 0, flags:; udp: 65494
;; QUESTION SECTION:
;canary.backupsol.com.          IN          TXT    — 420

;; ANSWER SECTION:
canary.backupsol.com. 60          IN          TXT "{\"id\": \"MAWDAHDOQH\", \"ti    — 430

;; Query time: 28 msec
;; SERVER: 10.100.2.3#53(10.100.2.3)          — 440
;; WHEN: Tue Jan 18 10:01:33 UTC 2022
;; MSG SIZE rcvd: 174

| TASK IDENTIFIER (AGENT IDENTIFIER) 902 | LOCAL TIMER VALUE 904 | DNS TEXT RECORD 906 | RESULT 908 |
|---|---|---|---|
| T_101 (A_101) | 1641903965 | {"id":"AGENTA_101", "timer":"1641903970", "timerOld":"1641903859"} | NO ACTION |
| T_101 (A_101) | 1641904015 | {"id":"AGENTA_101", "timer":"1641903970", "timerOld":"1641903859"} | RUN TASK & UPDATE DNS RECORD |
| T_101 (A_101) | 1641904077 | {"id":"AGENTA_101", "timer":"1641904010", "timerOld":"1641903915"} | NO ACTION |
| T_101 (A_101) | 1641904114 | {"id":"AGENTA_101", "timer":"1641904120", "timerOld":"1641904160"} | NO ACTION |

*FIG. 9*

THREE AGENTS SYNCHRONIZING OVER DNS
AND EXECUTING EVERY 60 SECONDS

1100

INDEPENDENT AGENT SYNCHRONIZATION USING DOMAIN NAME SYSTEM

BACKGROUND

Multiple agents running on separate systems (e.g., as multiple instances) may each execute a periodic task (e.g., once per hour). For example, the task might regularly check a set of Application Programming Interfaces ("APIs") and, when certain conditions are met, write information to a messaging program channel. Overall, a designer might want to avoid each of the agents performing the same task at approximately the same time (e.g., to avoid ten tasks all writing the same information to the messaging program channel). It is known that agent might communicate with each other to coordinate and synchronize performance of such a task. In some cases, a third-party service such as APACHE® ZOOKEEPER™ or an etcd key-value store for scheduler coordination could be used to help synchronize performance.

Each of these approaches, however, can have drawbacks. For example, they may incur significant processing and communication overhead (e.g., to keep track of what other agents are running at any given time). It would therefore be desirable to facilitate independent agent synchronization for a computing environment in a secure, efficient, and accurate manner.

SUMMARY

Methods and systems may involve an agent task scheduler that includes a local timer to generate a current local timer value. An agent task scheduler, independent of other agent task schedulers, may arrange to periodically perform a task scheduling process. The agent task scheduler may obtain a current Domain Name System ("DNS") text record that includes a next timer value indicating when a task should next be executed and a prior timer value indicating when the task was last executed. If the current local timer value is greater than the next timer value in the DNS text record, the scheduler may update the next timer value in the DNS text record to the current local timer value plus a value associated with periodic performance of the task scheduling process. The scheduler may also update the prior timer value in the DNS text record to the current local timer value and perform the task.

Some embodiments comprise: means for arranging, by a computer processor of an agent task scheduler that is independent of other agent task schedulers, to periodically perform a task scheduling process; means for obtaining a current Domain Name System ("DNS") text record that includes a next timer value indicating when a task should next be executed and a prior timer value indicating when the task was last executed; and if a current local timer value, generated by a local timer, is greater than or equal to the next timer value in the DNS text record: means updating the next timer value in the DNS text record to the current local timer value plus a value associated with periodic performance of the task scheduling process, means for updating the prior timer value in the DNS text record to the current local timer value, and means for performing the task.

Some technical advantages of some embodiments disclosed herein are improved systems and methods to facilitate independent agent synchronization for a computing environment in a secure, efficient, and accurate manner.

BRIEF DESCRIPTION OF THE DRAWINGS

FIG. 1 illustrates a DNS configuration.

FIG. 3 illustrates an agent synchronization method according to some embodiments.

FIG. 4 is agent synchronization DNS live check code according to some embodiments.

FIG. 9 illustrates a task database in accordance with some embodiments.

DETAILED DESCRIPTION

Figure 2:
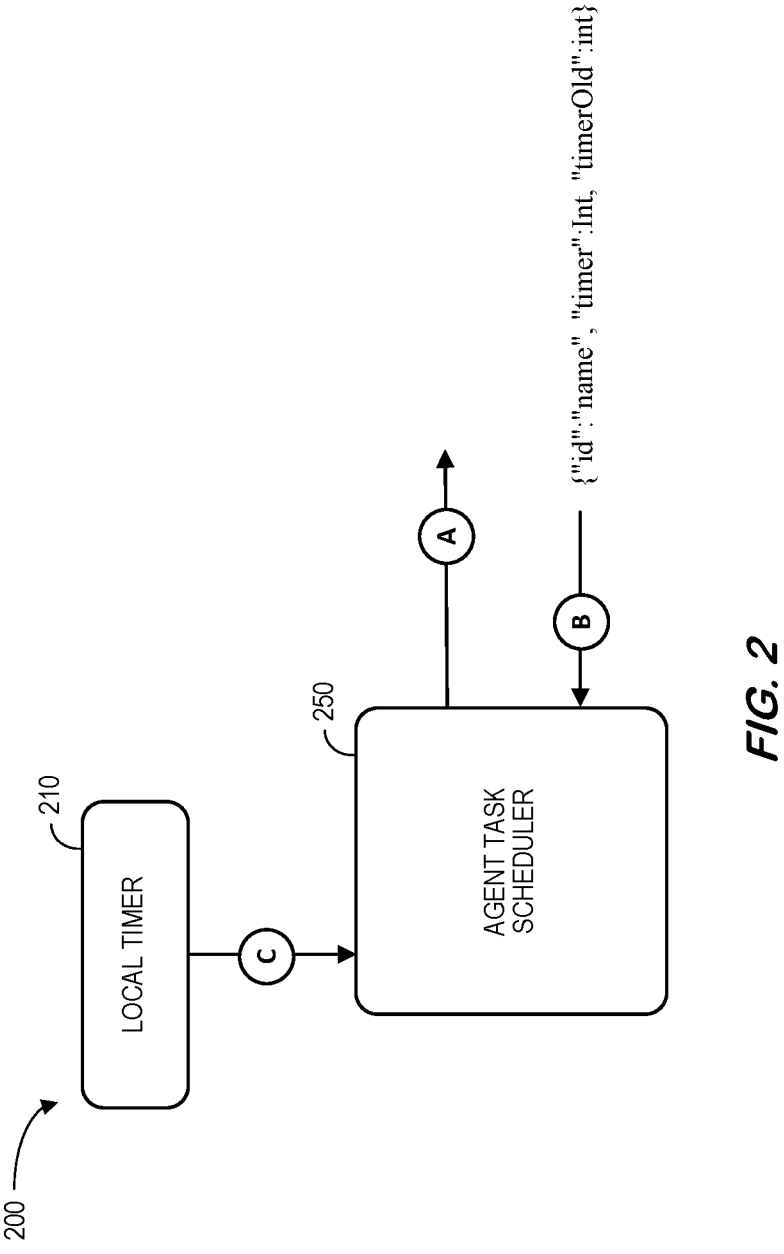
FIG. 2 is a high-level architecture for an agent synchronization system in accordance with some embodiments.

In the following detailed description, numerous specific details are set forth in order to provide a thorough understanding of embodiments. However, it will be understood by those of ordinary skill in the art that the embodiments may be practiced without these specific details. In other instances, well-known methods, procedures, components and circuits have not been described in detail so as not to obscure the embodiments.

One or more specific embodiments of the present invention will now be described. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Some embodiments of the present invention utilize features of the Domain Name System ("DNS"). The DNS is a hierarchical and decentralized naming system used to identify computers reachable through the Internet or other Internet Protocol ("IP") networks. The resource records contained in the DNS associate domain names with other forms of information (e.g., mapping domain names to the numerical IP addresses needed to locate services and devices using underlying network protocols. FIG. 1 illustrates a DNS configuration 100. In which an agent 110 communicates with a DNS-server 130 via a distributed communication network 120, such as the Internet. The agent 110 might, for example, seek the appropriate IP address for a web page (e.g., domain name). The DNS-server 130 and a DNS-resolver 140 work together to provide this information to the agent 110. The DNS-resolver 140 may be responsible for initiating and sequencing the queries that ultimately lead to a full resolution (translation) of the resource sought (e.g., translation of a domain name into an IP address). Note that there are different types of DNS records or resource records having different tasks. A text (or "TXT") record can be used to exchange various types of information, such as for validation of a search console or Secure Sockets Layer ("SSL") certificates.

FIG. 2 is a high-level block diagram of an agent synchronization system 200 according to some embodiments. The system 200 is associated with a single agent but note that many such agents may run simultaneously, independent of each other. That is, an agent doesn't communicate with other agents and, in fact, is not even aware of the existence of other agents. The system includes a local timer 210 to generate a current local timer value. An agent task scheduler 250 automatically arranges to periodically perform a task scheduling process (e.g., once every minute). As used herein, the term "automatically" may refer to a device or process that can operate with little or no human interaction.

At (A), the agent task scheduler 250 requests a DNS text record and the record is received at (B). The DNS text record includes a "next timer value" indicating when a task should next be executed (e.g., the "timer" integer value in FIG. 2). The DNS text record also includes a "prior timer value" indicating when a task was last executed (e.g., the "timer-Old" integer value in FIG. 2). The agent task scheduler 250 checks the current local timer value generated by the local timer 210 at (C). If the current local timer value is greater than or equal to the next timer value in the DNS text record, the agent task scheduler 250 will update the next timer value in the DNS text record to the current local timer value plus a value associated with periodic performance of the task scheduling process. The agent task scheduler 250 will also update the prior timer value in the DNS text record to the current local timer value and perform the task.

According to some embodiments, devices, including those associated with the system 200 and any other device described herein, may exchange data via any communication network, which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The elements of the system 200 may store data into and/or retrieve data from various data stores, which may be locally stored or reside remote from the agent task scheduler 250. Although a single agent task scheduler 250 is shown in FIG. 2, any number of such devices may be included. Moreover, various devices described herein might be combined according to embodiments of the present invention. For example, in some embodiments, the agent task scheduler 250 and the local timer 210 might comprise a single apparatus. Some or all of the system 200 functions may be performed by a constellation of networked apparatuses, such as in a distributed processing or cloud-based architecture.

An operator (e.g., a database administrator) may access the system 200 via a remote device (e.g., a Personal Computer ("PC"), tablet, or smartphone) to view data about and/or manage operational data in accordance with any of the embodiments described herein. In some cases, an interactive graphical user interface display may let an operator or administrator define and/or adjust certain parameters (e.g., to set up or adjust various mapping relationships) and/or provide or receive automatically generated recommendations, results, and/or alerts from the system 200.

FIG. 3 illustrates a method to facilitate independent agent synchronization for a computing environment in a secure, efficient, and accurate manner according to some embodiments. The flow charts described herein do not imply a fixed order to the steps, and embodiments of the present invention may be practiced in any order that is practicable. Note that any of the methods described herein may be performed by hardware, software, an automated script of commands, or any combination of these approaches. For example, a computer-readable storage medium may store instructions that when executed by a machine result in performance according to any of the embodiments described herein.

At S310, a computer processor of an agent task scheduler (independent of other agent task schedulers) may arrange to periodically perform a task scheduling process. Note that other agents may also periodically perform task scheduling processes. At S320, the agent task scheduler obtains a current DNS text record that includes a next timer value indicating when a task should next be executed and a prior timer value indicating when the task was last executed. According to some embodiments, the DNS text record further includes a task identifier. In some embodiments, the DNS text record is encoded. The DNS text record may, in some embodiments, be implemented via DNS-as-a-Service. Moreover, the agent task scheduler may perform synchronization using API calls or other techniques.

If a current local timer value, generated by a local timer, is not greater than or equal to the next timer value in the DNS text record at S330, the process continues at S310. According to some embodiments, the timer values described herein are associated with EPOCH time (also referred to as Unix time, POSIX time, or a Unix timestamp). EPOCH time is a numerical value that represents the number of seconds that have elapsed since Jan. 1, 1970.

If the current local timer value is greater than or equal to the next timer value in the DNS text record at S330, the agent task scheduler may update the next timer value in the DNS text record to the current local timer value plus a value associated with periodic performance of the task scheduling process at S340. The value associated with periodic performance of the task scheduling process may, according to some embodiments, include a random time offset to reduce conflicts between independent agents. At S350, the agent task scheduler also updates the prior timer value in the DNS text record to the current local timer value. At S360, the task is performed and the process continues at S310.

In this way, embodiments may synchronize independent agents even when they do not know about each other (and there is no connectivity between them). Moreover, third-party tools are not required (e.g., a database, an arbiter, a queue, etc.). Embodiments may ensure that the task is executed by at least one agent. The agents may be started randomly but after starting they each check the DNS record every (50 to 60) seconds. Note that the agents may be stateless and can be killed or replaced at any moment. Moreover, there may be no instance affinity—that is, any agent may execute the task which in some embodiments can be changed dynamically (and be picked on each new run).

Note that the DNS infrastructure is very resilient. It is a core service of the Internet upon which every other service is dependent. A DNS record can hold different types of information and can have a special Time To Live ("TTL") property. An advantage of utilizing DNS as an arbiter is that multiple parties can check the record (but not every party can write to it). All major hyper-scalers have near infinite DNS scalability and capacity.

In some embodiments, a DNS text record store text used to synchronize different agents. All agents regularly check the DNS text record and update the record if their clock is bigger than the one in the record (indicating that execution of the task is required. On every run (e.g., every 60 seconds), each agent checks the DNS text record which may be formatted as:

{"id":"name, "timer":int, "timerOld":int} where "id" is the id or the name of the agent, "timer" holds the EPOCH time when the task will be executed, and "timerOld" is the old timer value (or when the task was last executed). By way of example, an entry might read {"id": "AGENTA", "timer":"1641903970", "timerOld": "1641903859"}.

FIG. 4 is agent synchronization DNS live check code 400 according to some embodiments. A first portion 410 of the code 400 uses "dig -t TXT canary.backupsol.com" to ask a local DNS resolver for the DNS text record. In other embodiments, the agent might instead request the record via DNS-as-a-Service (e.g., "dig @1.1.1.1 -t canary.backupsol-.com" for CLOUDFARE®) or using GOOGLE® cloud (e.g., "dig @8.8.8.8 -t canary.backupsol.com").

A second portion 420 of the code 400 includes an Extension Mechanisms for DNS ("EDNS") version number that expands the size of several parameters of the DNS protocol to increase the functionality of the protocol. A third portion 430 of the code 400 provides an answer section, and a fourth portion 440 of the code 400 provides details about the query (e.g., a query time, a query date and time, etc.). According to some embodiments, a DNS call can be executed live to see the changes in real time.

In this way, all agents may be totally independent and do not have any knowledge for each other. The agents synchronize themselves over a DNS text record which can be checked remotely via a regular DNS query (and the DNS text record can be encrypted if there is a need for that). This may be useful, for example, for third-party monitoring (to know if and when the task has been executed. Embodiments may implement monitoring by querying the DNS record regularly and evaluating the different fields. The timer value is the value indicating when next the job would be executed and the timerOld indicates when it was last executed. The cost for managing a DNS zone (e.g., using ROUTE53®) may be, for example, $0.50 per month which includes one million free API calls. For CLOUDFARE®, as another example, an account can make over one thousand free API calls per minute. As a result, the cost of ownership of a solution that manages independent agents in accordance with embodiments described herein is close to zero.

Figure 5:
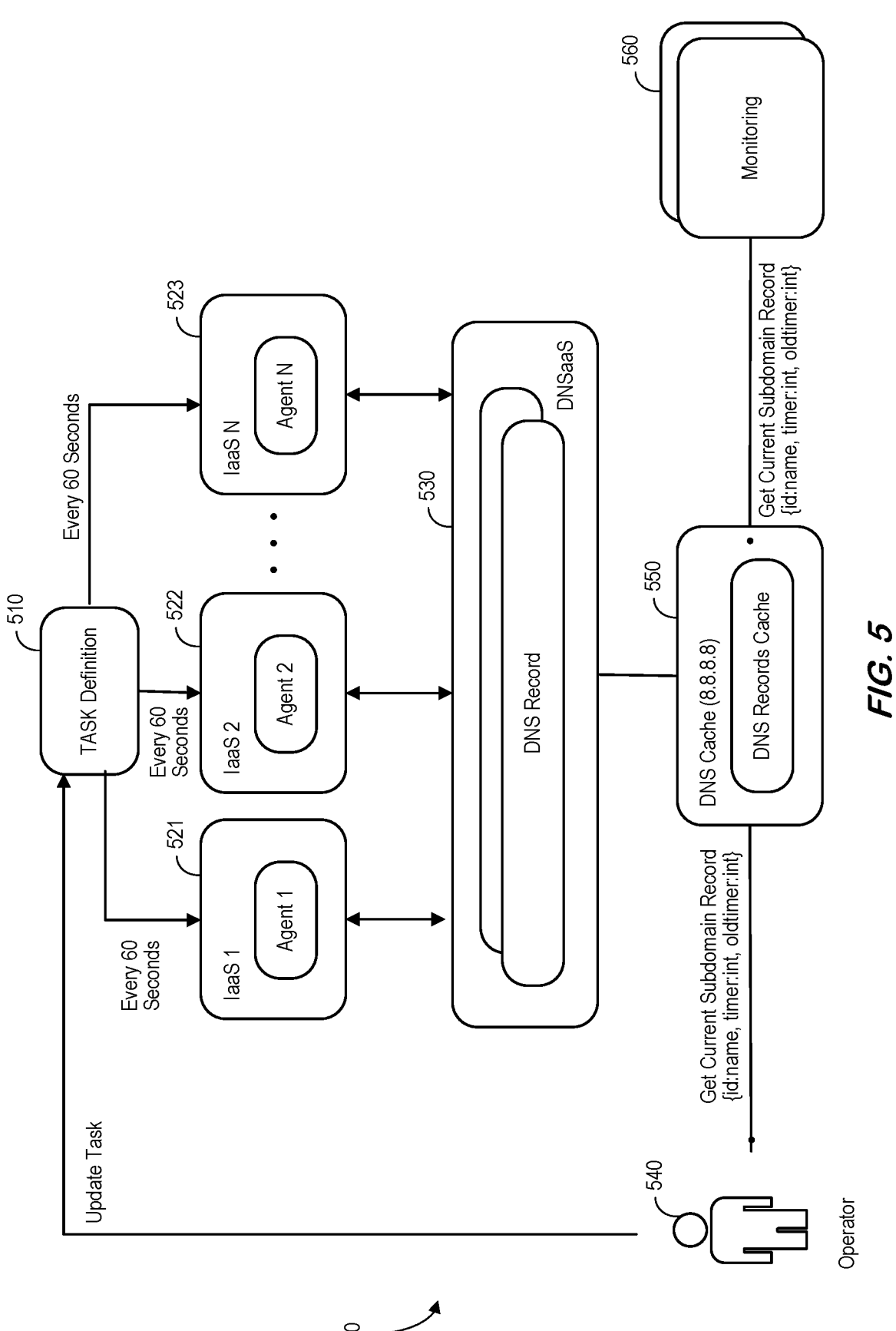
FIG. 5 is an agent synchronization block diagram of a system in accordance with some embodiments.

FIG. 5 is an agent synchronization block diagram of a system 500 in accordance with some embodiments. A task definition 510, which can be updated by an operator 540, is periodically checked by agents 1 through N implemented as an Infrastructure-as-a-Service ("IaaS") 521, 522, 523. Each agent accesses a DNS record implemented as DNS-as-a-Service ("DNSaaS") 530. A DNS cache 550 includes a DNS records cache that can be obtained by the operator 540 and/or one or more monitoring applications 560.

Figure 6:
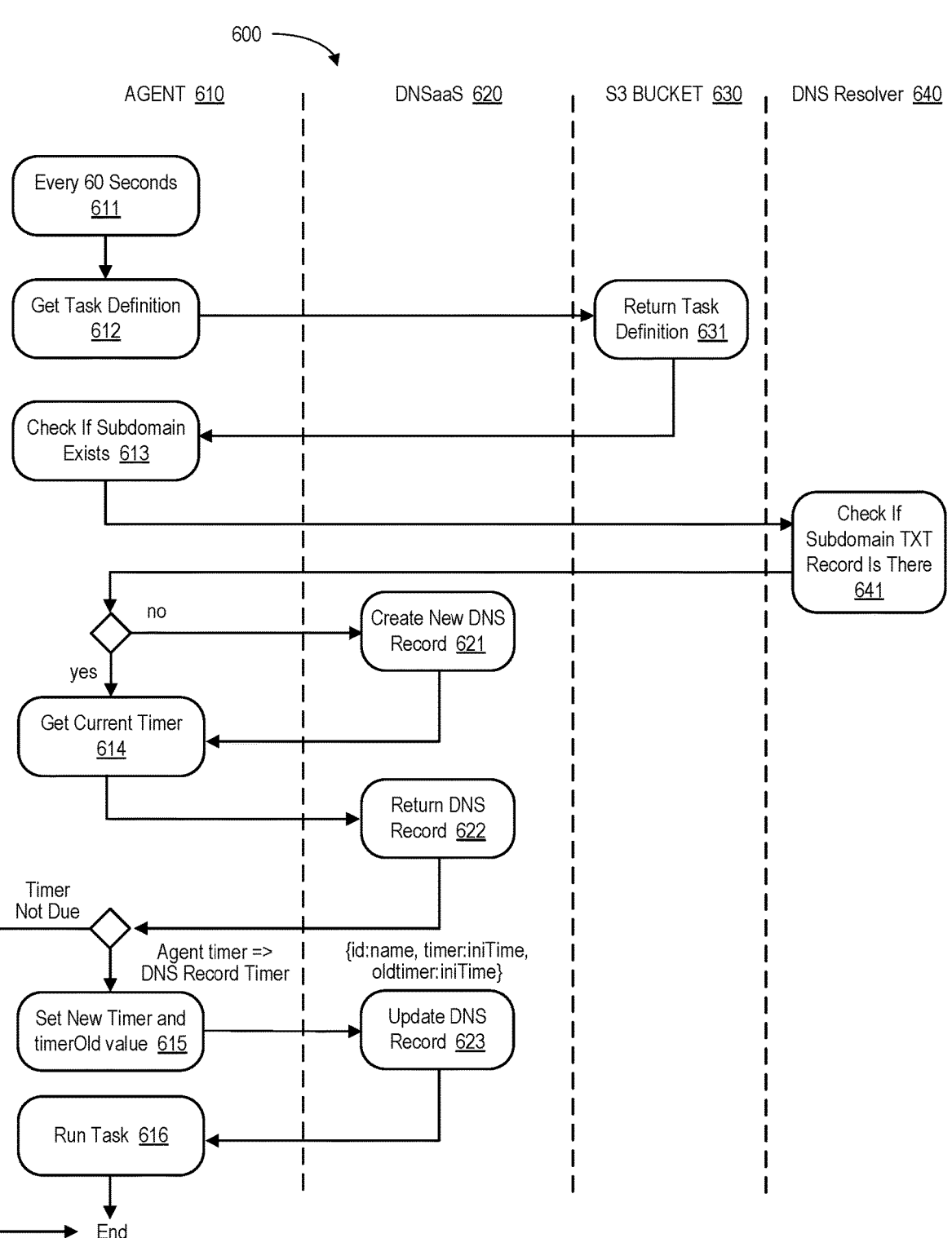
FIG. 6 is an activity diagram according to some embodiments.

FIG. 6 is an activity diagram 600 according to some embodiments. An agent 610 periodically runs a task scheduling process every 60 seconds at 611. The agent 610 may request a task definition at 612 which is returned from cloud storage such as from an AMAZON® Simple Storage Service ("S3") bucket 630 at 631. The agent 610 then communicates with a DNS resolver 640 to check if the appropriate subdomain and text record already exists at 613. If the DNS resolver 640 indicates that the subdomain text record does not already exist at 641, the agent 610 works with a DNSaaS 620 to create a new DNS record at 621. Next (or if the DNS resolver 640 had indicated that the subdomain text record did already exist at 641), the agent 610 gets the current local timer at 614 and retrieves the DNS record from the DNSaaS 620 at 622. If the timer is not due, the activity diagram 600 ends. If the timer is due (that is, the local agent 610 timer is equal to or greater than the timer value in the DNS record), the agent 610 sets new timer and timerOld values at 615 and updates the DNS record via the DNSaaS 620 at 623. The agent 610 can then run the task at 616 before the activity diagram 600 ends.

Figure 7:
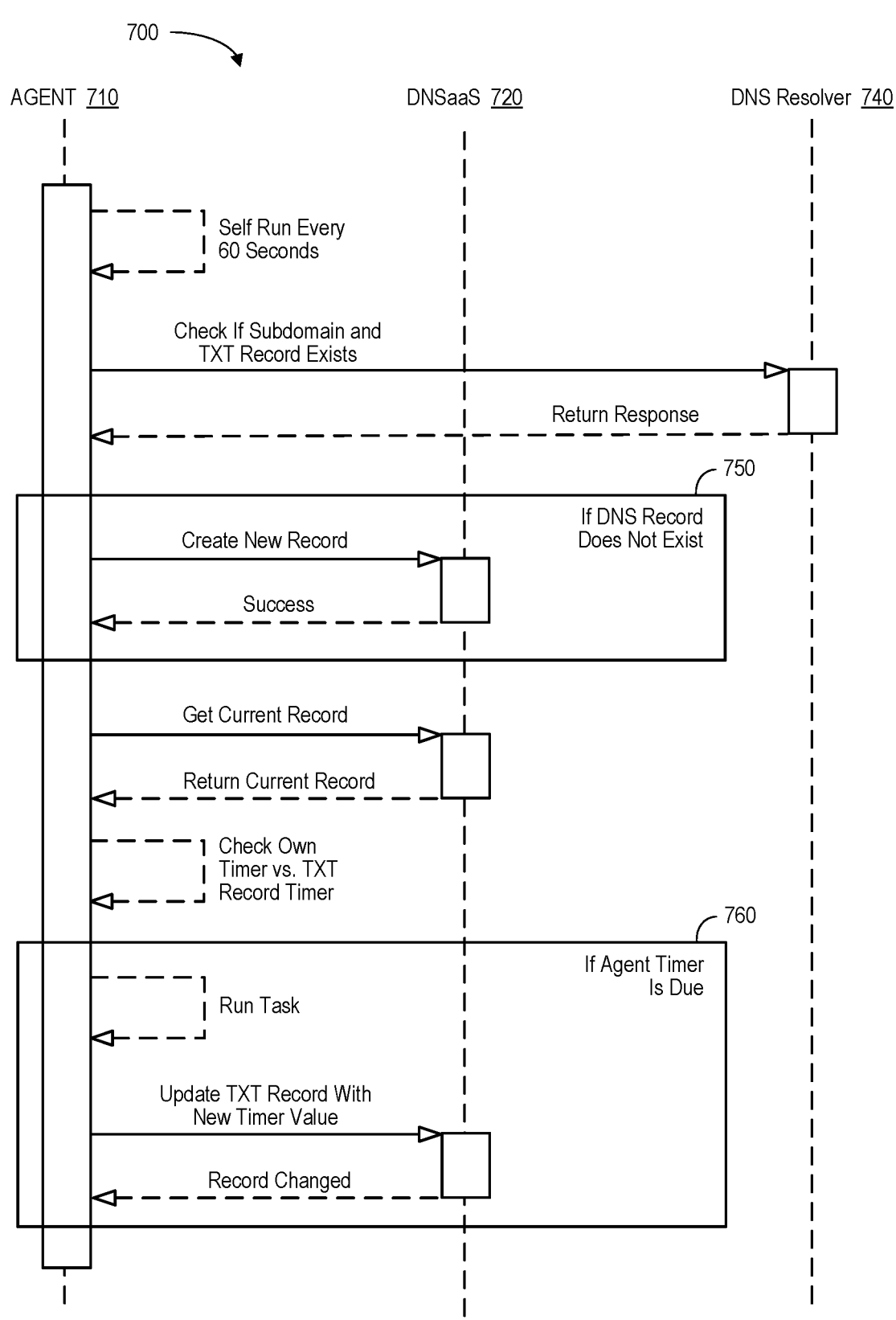
FIG. 7 is an agent synchronization sequential diagram in accordance with some embodiments.

FIG. 7 is an agent synchronization sequential diagram 700 in accordance with some embodiments. In particular, an agent 710 self runs a task scheduling process (e.g., every 60 seconds). The agent 710 checks with a DNS resolver 740 to determine if a subdomain and text record already exists. Based on a response from the DNS resolver 740 indicating that the DNS record does not exist 750, the agent 710 creates a new record using a DNSaaS 720.

The agent 710 can then get the current record from the DNSaaS 720 and check its own timer against the text record timer value. If the task is not due, the synchronization sequential diagram 700 is complete (e.g., perhaps another agent recently completed the task and updated the DNS text record). If the check indicates that the task is due 760, the agent 710 runs the task and updates the DNS text record with the new timer and timerOld values before the synchronization sequential diagram 700 is complete.

Figure 8:
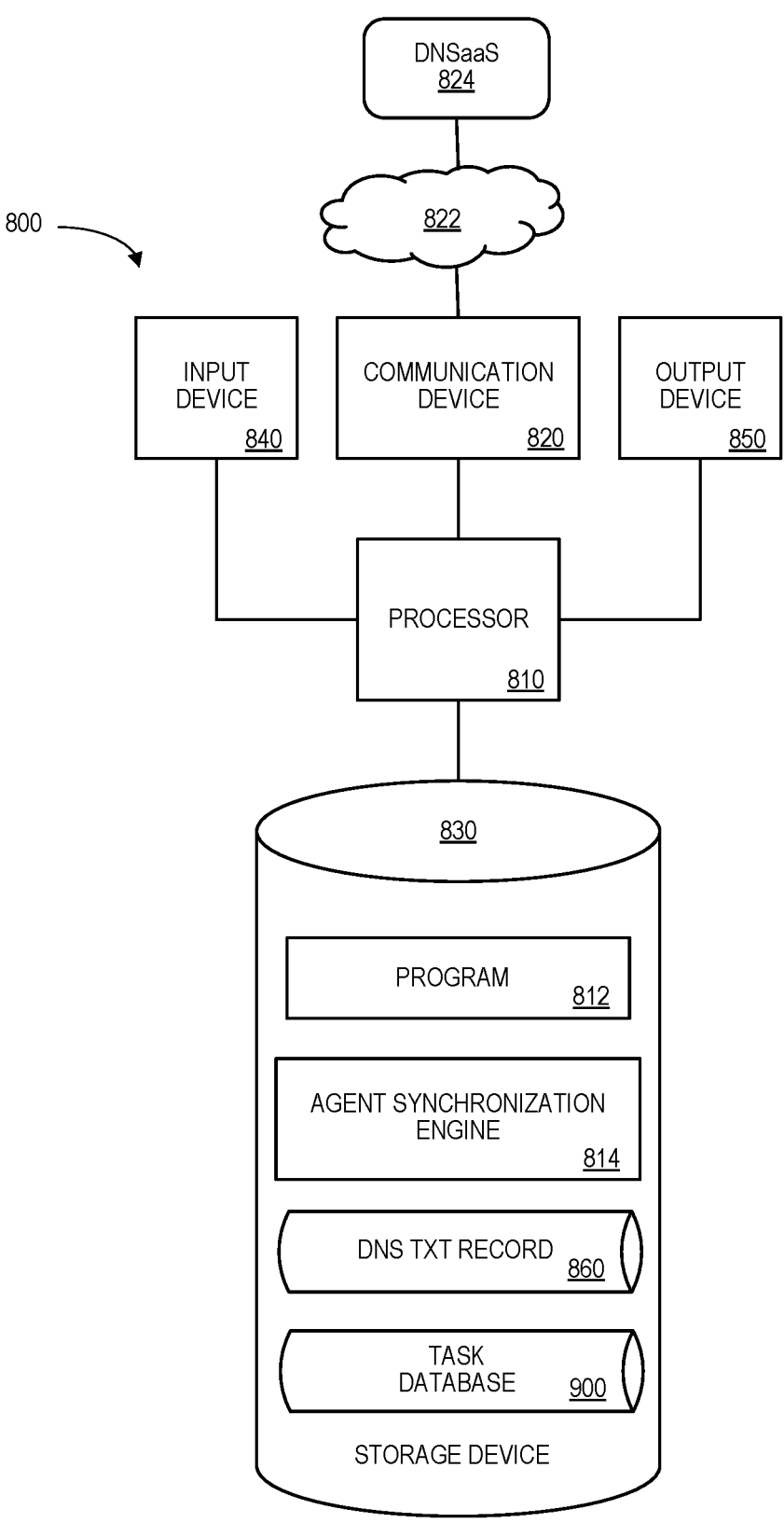
FIG. 8 is an apparatus or platform according to some embodiments.

Note that the embodiments described herein may be implemented using any number of different hardware configurations. For example, FIG. 8 is a block diagram of an apparatus or platform 800 that may be, for example, associated with the system 200 of FIG. 2 (and/or any other system described herein). The platform 800 comprises a processor 810, such as one or more commercially available CPUs in the form of one-chip microprocessors, coupled to a communication device 820 configured to communicate via a communication network (not shown in FIG. 8). The communication device 820 may be used to communicate, for example, with one or more remote user platforms or a DNSaaS 824 via a communication network 822. The platform 800 further includes an input device 840 (e.g., a computer mouse and/or keyboard to input data about a monitored system or data source) and an output device 850 (e.g., a computer monitor to render a display, transmit recommendations or alerts, and/or create monitoring reports). According to some embodiments, a mobile device and/or PC may be used to exchange data with the platform 800.

The processor 810 also communicates with a storage device 830. The storage device 830 can be implemented as a single database, or the different components of the storage device 830 can be distributed using multiple databases (that is, different deployment data storage options are possible). The storage device 830 may comprise any appropriate data storage device, including combinations of magnetic storage devices (e.g., a hard disk drive), optical storage devices, mobile telephones, and/or semiconductor memory devices. The storage device 830 stores a program 812 and/or agent synchronization engine 814 for controlling the processor 810. The processor 810 performs instructions of the programs 812, 814, and thereby operates in accordance with any of the embodiments described herein. For example, the processor 810 may include a local timer to generate a current local timer value. An agent task scheduler, independent of other agent task schedulers, may arrange to periodically perform a task scheduling process. The processor 810 may obtain a current DNS text record that includes a next timer value indicating when a task should next be executed and a prior timer value indicating when the task was last executed. If the current local timer value is greater than the next timer value in the DNS text record, the processor 810 may update the next timer value in the DNS text record to the current local timer value plus a value associated with periodic performance of the task scheduling process. The processor 810 may also update the prior timer value in the DNS text record to the current local timer value and perform the task.

The programs 812, 814 may be stored in a compressed, uncompiled and/or encrypted format. The programs 812, 814 may furthermore include other program elements, such as an operating system, clipboard application, a database management system, and/or device drivers used by the processor 810 to interface with peripheral devices.

As used herein, data may be "received" by or "transmitted" to, for example: (i) the platform 800 from another device; or (ii) a software application or module within the platform 800 from another software application, module, or any other source.

In some embodiments (such as the one shown in FIG. 8), the storage device 830 further stores a copy of the DNS text record 860 and a task database 900. An example of a database that may be used in connection with the platform 800 will now be described in detail with respect to FIG. 9. Note that the database described herein is only one example, and additional and/or different data may be stored therein. Moreover, various databases might be split or combined in accordance with any of the embodiments described herein.

Referring to FIG. 9, a table is shown that represents the task database 900 that may be stored at the platform 800 according to some embodiments. The table may include, for example, entries identifying an agent synchronizing a task for a computing environment. The table may also define fields 902, 904, 906, 908 for each of the entries. The fields 902, 904, 906, 908 may, according to some embodiments, specify a task and agent identifier 902, a local timer value 904, a DNS TXT record 906, and a result 908. The task database 900 may be created and updated, for example, when a new task or agent is executed, when results 908 are generated, etc.

The task and agent identifier 902 might be a unique alphanumeric label or link that is associated with a task being synchronized by the agent. The local timer value 904 may comprise a current EPOCH timer value maintained by the agent. The DNS TXT record 906 might include, according to some embodiments, an identifier, a timer value (when the task should be performed), and a timerOld value (indicating the last time the task was performed). The result 908 might indicate, for example, that no action was taken (e.g., because another agent has recently performed the task) or that the task was performed and the DNS TXT record 906 was updated by this agent.

Figure 10:
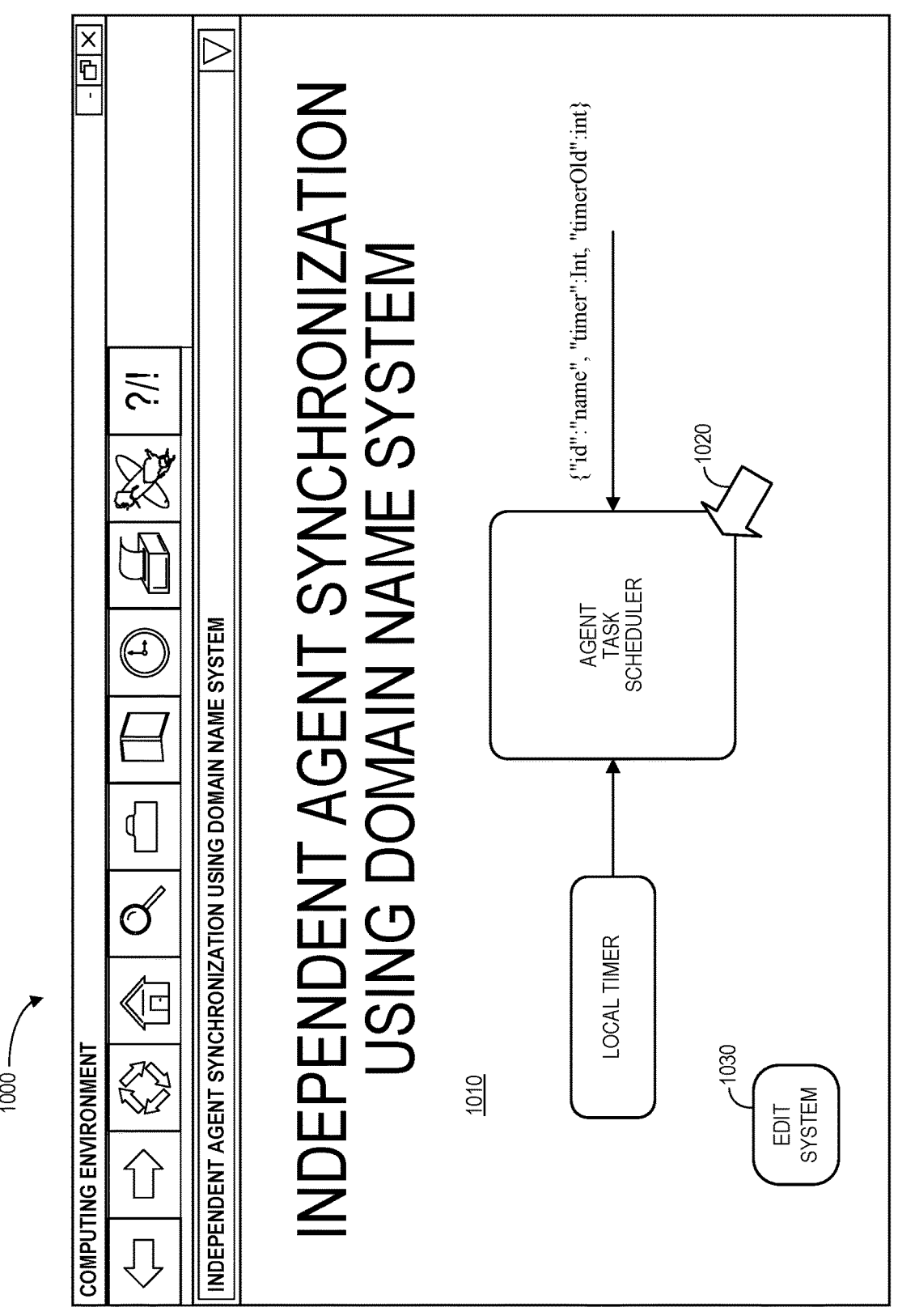
FIG. 10 is a human machine interface display in accordance with some embodiments.

FIG. 10 is a human-machine interface display 1000 in accordance with some embodiments. The display 1000 includes a graphical representation 1010 or dashboard that might be used to manage or monitor independent agent synchronization using DNS. In particular, selection of an element (e.g., via a touchscreen or computer mouse pointer 1020) might result in the display of a popup window that contains configuration data, task information, a periodic value, etc. The display 1000 may also include a userselectable "Edit System" icon 1030 to request system changes (e.g., to investigate or improve system performance).

Thus, embodiments may provide cost effective agent synchronization (with no third-party needed and a solution that can run dozens of agents over different IaaS instances). Embodiments may monitor job execution with a time log and/or DNS text record such that one can see the change on the record and the last time it was changed. Embodiments may be simple to implement and easily portable to any solution that needs independent agent synchronization The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Figure 11:
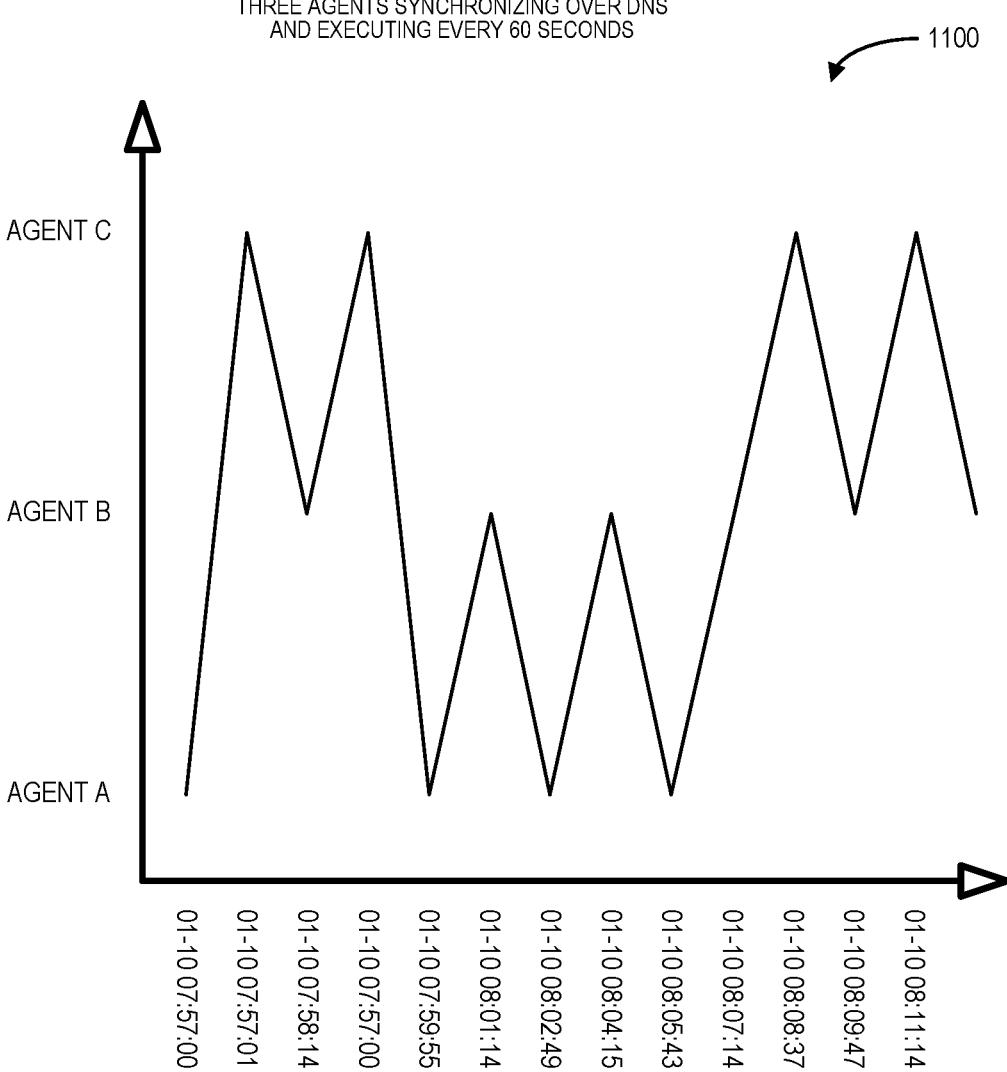
FIG. 11 illustrates an example of task execution results according to some embodiments.

FIG. 11 illustrates an example of task execution results 1100 according to some embodiments. The results 1100 comprise a graph that shows, over time, which of three agents (agents A through C) performed a task using DNS to synchronize performance. The agents were deployed as applications with the instances each started at different times and executed between 50 and 60 seconds apart.

Although specific hardware and data configurations have been described herein, note that any number of other configurations may be provided in accordance with some embodiments of the present invention (e.g., some of the data associated with the databases described herein may be combined or stored in external systems). Moreover, although some embodiments are focused on particular types of tasks, any of the embodiments described herein could be applied to other types of tasks. Moreover, the displays shown herein are provided only as examples, and any other type of user interface could be implemented.

The present invention has been described in terms of several embodiments solely for the purpose of illustration. Persons skilled in the art will recognize from this description that the invention is not limited to the embodiments described but may be practiced with modifications and alterations limited only by the spirit and scope of the appended claims.

The invention claimed is:

1. A system to facilitate agent synchronization for a computing environment, comprising:

an agent, including:

a local timer, maintained by the agent, generating a current local timer value; and an agent task scheduler, coupled to the local timer and independent of other agent task schedulers, including:

a computer processor, and a memory storage device, coupled to the computer processor, including instructions that, when executed by the computer processor, enable the agent task scheduler to:

schedule to periodically perform a task scheduling process, obtain an encoded current Domain Name System ("DNS") text record that includes a next timer value indicating when a task should next be executed, a prior timer value indicating when the task was last executed, and a task identifier, if the current local timer value is greater than or equal to the next timer value in the DNS text record:

update the next timer value in the DNS text record to the current local timer value plus a value associated with periodic performance of the task scheduling process plus a random time offset, update the prior timer value in the DNS text record to the current local timer value, and perform the task associated with the task identifier.

2. The system of claim 1, wherein the agent task scheduler is further to:

check to determine if a DNS subdomain and the DNS text record already exist and, if the DNS subdomain and the DNS text record do not already exist:

create the DNS subdomain and the DNS text record using an appropriate task identifier, and use the current local timer value plus the value associated with periodic performance of the task scheduling process as the next timer value.

3. The system of claim 2, wherein the check to determine if a DNS subdomain and the DNS text record already exist is performed via a DNS-resolver.

4. The system of claim 1, wherein the current local timer value is associated with EPOCH time.

5. The system of claim 1, wherein other agents also periodically perform task scheduling processes.

6. The system of claim 1, wherein the DNS text record is implemented via DNS-as-a-Service.

7. The system of claim 1, wherein the agent task scheduler performs synchronization using Application Programming Interface ("API") calls.

8. A computer-implemented method to facilitate agent synchronization for a computing environment, comprising:

scheduling, by a computer processor of an agent task scheduler, associated with an agent, that is independent of other agent task schedulers, to periodically perform a task scheduling process;

obtaining an encoded current Domain Name System ("DNS") text record that includes a next timer value indicating when a task should next be executed, a prior timer value indicating when the task was last executed, and a task identifier; and if a current local timer value, generated by a local timer maintained by the agent, is greater than or equal to the next timer value in the DNS text record:

updating the next timer value in the DNS text record to the current local timer value plus a value associated with periodic performance of the task scheduling process plus a random time offset, updating the prior timer value in the DNS text record to the current local timer value, and performing the task associated with the task identifier.

9. The method of claim 8, further comprising:

checking to determine if a DNS subdomain and the DNS text record already exist and, if the DNS subdomain and the DNS text record do not already exist:

creating the DNS subdomain and the DNS text record using an appropriate task identifier, and using the current local timer value plus the value associated with periodic performance of the task scheduling process as the next timer value.

10. The method of claim 9, wherein the check to determine if a DNS subdomain and the DNS text record already exist is performed via a DNS-resolver.

11. The method of claim 8, wherein the current local timer value is associated with EPOCH time.

12. A non-transitory, computer readable medium having executable instructions stored therein to perform a method to facilitate agent synchronization for a computing environment, the method comprising:

scheduling, by a computer processor of an agent task scheduler, associated with an agent, that is independent of other agent task schedulers, to periodically perform a task scheduling process;

obtaining an encoded current Domain Name System ("DNS") text record that includes a next timer value indicating when a task should next be executed, a prior timer value indicating when the task was last executed, and a task identifier; and checking, by a DNS-resolver, to determine if a DNS subdomain and the DNS text record already exist and, if the DNS subdomain and the DNS text record do not already exist:

creating the DNS subdomain and the DNS text record using an appropriate task identifier, and using the current local timer value plus the value associated with periodic performance of the task scheduling process as the next timer value;

if a current local timer value, generated by a local timer maintained by the agent, is greater than or equal to the next timer value in the DNS text record:

updating the next timer value in the DNS text record to the current local timer value plus a value associated with periodic performance of the task scheduling process plus a random time offset, updating the prior timer value in the DNS text record to the current local timer value, and performing the task associated with the task identifier.

13. The medium of claim 12, wherein other agents also periodically perform task scheduling processes.

14. The medium of claim 12, wherein the DNS text record is encoded.

15. The medium of claim 12, wherein the DNS text record is implemented via DNS-as-a-Service.

16. The medium of claim 12, wherein the agent task scheduler performs synchronization using Application Programming Interface ("API") calls.

17. The system of claim 1, wherein the agent task scheduler performs a live DNS call to initiate synchronization.

18. The method of claim 8, wherein the agent task scheduler performs a live DNS call to initiate synchronization.

19. The medium of claim 12, wherein the agent task scheduler performs a live DNS call to initiate synchronization.

20. The system of claim 1, wherein the agent has no knowledge of any other agents.

21. The method of claim 8, wherein the agent has no knowledge of any other agents.

* * * * *